United States Patent
Katsuro et al.

(10) Patent No.: US 6,838,068 B2
(45) Date of Patent: Jan. 4, 2005

(54) SILICA GEL

(75) Inventors: Yoshio Katsuro, Kitakyushu (JP);
Takashi Yamaguchi, Kitakyishu (JP);
Takayuki Yoshimori, Kitakyishu (JP);
Hanako Kato, Kitakyishu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 344 days.

(21) Appl. No.: 09/891,412

(22) Filed: Jun. 27, 2001

(65) Prior Publication Data

US 2002/0018743 A1 Feb. 14, 2002

(30) Foreign Application Priority Data

Jun. 30, 2000 (JP) ........................................ 2000-197558
Mar. 9, 2001 (JP) ........................................ 2001-066167

(51) Int. Cl.⁷ .............................................. C01B 33/12
(52) U.S. Cl. ........................................................ 423/338
(58) Field of Search ................................ 423/335, 336, 423/338

(56) References Cited

U.S. PATENT DOCUMENTS

| 4,619,908 A | | 10/1986 | Cheng et al. | |
|---|---|---|---|---|
| 5,307,821 A | * | 5/1994 | Misuda et al. | 131/290 |
| 5,750,258 A | * | 5/1998 | Sakai et al. | 428/405 |
| 5,834,551 A | * | 11/1998 | Haraguchi et al. | 524/492 |

FOREIGN PATENT DOCUMENTS

| FR | 2 093 176 | 1/1972 |
|---|---|---|
| JP | 62113713 A | 5/1987 |
| JP | 62-113713 | 5/1987 |
| JP | 9-30809 | 2/1997 |
| JP | 9030809 A | 2/1997 |
| JP | 9-143461 | 6/1997 |
| JP | 11-157827 | 6/1999 |
| JP | 2000-154017 | 6/2000 |

OTHER PUBLICATIONS

Nov. 13, 1998 vol. 282 Science, pp. 1302–1305, *Ultrastable Mesostructured Silica Vesicles*, Seong Su Kim, Wenzhong Zhang, Thomas J. Plnnavaia.
Seiichi Kondo, et al., Shikizai Kyokaishi, vol. 55, No. 3, pp. 131–135, "The Effect of pH of Hydrothermal Treatmet of Hydrogel for the Structure of Surface and Pore of Silica Gel", 1982 (with Chemical Abstracts), no month.
Pamela J. Davis, et al., Journal of Non–Crystalline Solids, vol. 142, pp. 197–207, "Pore Structure Evolution in Silica Gel During Aging/Drying II. Effect of Pore Fluids", 1992, no month.
Thierry Lours, et al., Journal of Non–Crystalline Solids, vol. 95–96, pp. 1151–1157, "Saxs and Bet Studies of Aging and Densification F Silica Aerogels", 1987, no month.
Derwent Abstracts, JP 9–030809, Feb. 4, 1997.
Patent Abstracts of Japan, JP 62–113713, May 25, 1987.

* cited by examiner

*Primary Examiner*—Stanley S. Silverman
*Assistant Examiner*—Edward M. Johnson
(74) *Attorney, Agent, or Firm*—Oblon, Spivak, McClelland, Maier & Neustadt, P.C.

(57) ABSTRACT

A method of producing a silica gel by hydrolyzing a silicon alkoxide and subjecting the resulting hydrogel to a hydrothermal treatment substantially without aging it is described. Also described in a silica gel produced by such a method and a silica gel which has the following characteristics:

(a) the pore volume is from 0.6 to 1.6 ml/g,
(b) the specific surface area is from 300 to 900 m²/g,
(c) the mode diameter (Dmax) of pores is less than 20 nm,
(d) the volume of pores having diameters within ±20% of Dmax is at least 50% of the total pore volume,
(e) it is amorphous, and
(f) the content of metal impurities is at most 500 ppm.

30 Claims, 6 Drawing Sheets

SILICA GEL

BACKGROUND OF THE INVENTION

1. Field of the Invention

The present invention relates to a novel silica gel which is excellent in e.g. heat resistance and hydrothermal resistance.

2. Discussion of Background

Silica gel has been widely used as a drying agent and in recent years, it has been used for various purposes as e.g. a catalyst support, a separating medium or an adsorbent. Accordingly, requirements for performances of the silica gel have been diversified according to the purposes. The performances of the silica gel are greatly influenced by physical properties of the silica gel such as the surface area, the pore diameter, the pore volume, the pore size distribution, and these physical properties are greatly influenced by conditions for producing the silica gel.

As a method for producing the silica gel, the most common method is to hydrolyze an alkali silicate such as sodium silicate with a mineral acid, and gelate the resulting silica hydrosol, followed by drying. Many proposals have been made with respect to the details of the production method so as to improve the performances of the silica gel.

For example, JP-A-62-113713 proposes a method for producing a silica gel having a narrow pore distribution, produced by gelling silica hydrosol formed by reaction of alkali silicate aqueous solution and mineral acid solution, treating a silica hydrogel with acid solution at a pH under 2.5, washing with water, adjusting the pH to 4–9 in a buffer solution and treating hydrothermally. In Examples of the above gazette, a silica gel having an average pore diameter of from 6.7 to 8.5 nm and a pore volume of from about 0.8 to about 0.9 ml/g can be obtained by the above method.

Further, JP-A-9-30809 proposes a method wherein a silica hydrogel is dried by batch flow drying and then a hydrothermal treatment is carried out. Changes in performances of the silica gel obtained by this method are also confirmed, and a silica gel having a sharper pore distribution can be obtained. However, the pore volume, the specific surface area and the average pore diameter can not adequately be changed, and this method is inadequate as a method to obtain a silica gel having desired physical properties.

On the other hand, in the silica gel obtained by using an alkali silicate as a material as explained above, usually a considerable amount of impurities such as sodium, calcium, magnesium, titanium, aluminum and zirconium derived from the material is contained. The metal impurities in the silica gel can have a significant influence over the performances of the silica gel even if the total content is so small as at a level of several hundreds ppm. For example, metal impurities can (1) accelerate crystallization of the silica gel at a high temperature, 2) accelerate a hydrothermal reaction of the silica gel in the presence of water to cause an increase in the pore diameter and the pore volume, a decrease in the specific surface area and a broadening in the pore distribution, and 3) decrease the sintering temperature, and accordingly when a silica gel containing them is heated, cause a decrease in the specific surface area tends to be accelerated. These influences tend to be significant with impurities of alkali metals and alkaline earth metals. Further, if titanium or aluminum as an impurity are present on the surface of the silica gel or in a siloxane bond, the acidification site tends to increase, and the silica gel itself may show an unfavorable catalytic effect when used as a catalyst carrier or an adsorbent.

Kim et al. (Ultrastable Mesostructured Silica Vesicles *Science*, 282, 1302 (1998) describes the preparation of mesoporous molecular sieves of high thermal (1000° C.) and hydrothermal stabilities (more than 150 hours at 100° C.) by a supramolecular assembly pathway which relies on hydrogen bonding between electrically neutral gemini surfactants and silica precursors derived from tetraethylorthosilicates.

Accordingly, as a method for producing silica gel containing no impurities, a method of purifying a gel obtained by neutralizing an alkali silicate and a method of hydrolyzing a silicon alkoxide have been known, and particularly by the latter method, the silicone alkoxide can be purified by e.g. distillation, and it is thereby possible to obtain a silica gel having a high purity relatively easily. However, a silica gel obtained by a sol-gel method from a silicon alkoxide tends to have a small average pore diameter and a broad pore distribution in general. Further, substantially no report has been made with respect to an improvement in performances even if a hydrothermal treatment is applied to the silica gel.

SUMMARY OF THE INVENTION

Under these circumstances, it is an object of the present invention to provide a method of producing a silica gel having not only large pore volume and specific surface area, but also a narrow pore distribution and excellent heat resistance and hydrothermal resistance.

According to another embodiment of the present invention is a silica gel produced by a method of producing a silica gel having not only large pore volume and specific surface area, but also a narrow pore distribution and excellent heat resistance and hydrothermal resistance.

According to another embodiment of the present invention is a silica gel having not only large pore volume and specific surface area, but also a narrow pore distribution and excellent heat resistance and hydrothermal resistance.

These and other object of the present invention are made possible by a method of producing a silica gel by hydrolyzing a silicon alkoxide and subjecting the resulting hydrogel to a hydrothermal treatment substantially without aging it.

The silica gel according to the present invention may be characterized as having the following characteristics:

(a) the pore volume is from 0.6 to 1.6 ml/g, (b) the specific surface area is from 300 to 900 $m^2$/g, (c) the mode diameter (Dmax) of pores is less than 20 nm, (d) the volume of pores having diameters within ±20% of Dmax is at least 50% of the total pore volume, (e) it is amorphous, and (f) the content of metal impurities is at most 500 ppm.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
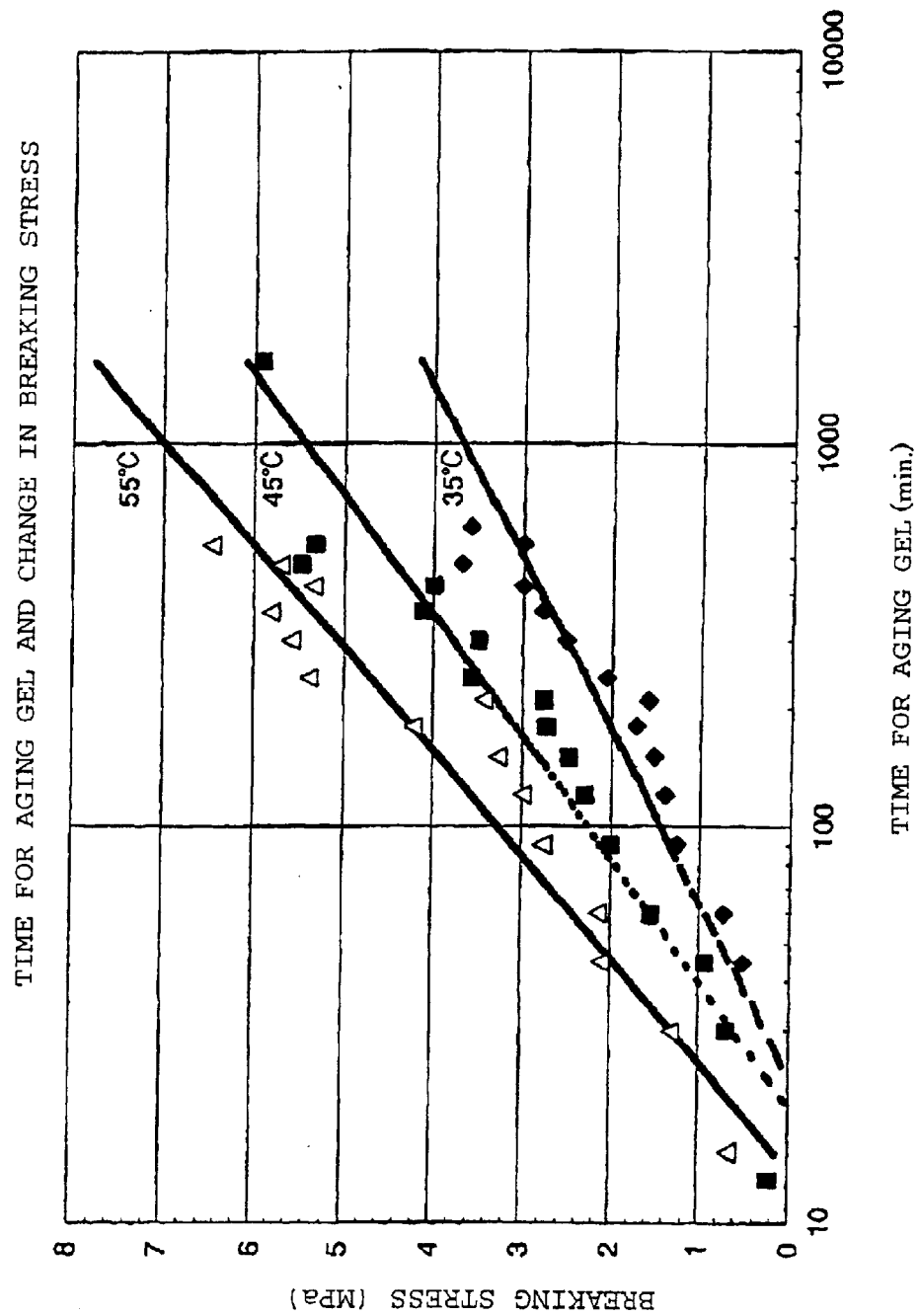
FIG. 1 is a diagram illustrating the relation between the aging time and the breaking stress of a hydrogel of silica when subjected to aging at temperatures of 35° C., 45° C. and 55° C.

Now, the present invention will be described in detail below.

The silica gel of the present invention has a pore volume and a specific surface area larger than those of conventional one, and the pore volume is generally from 0.6 to 1.6 ml/g, preferably from 0.8 to 1.6 ml/g as measured by a nitrogen gas adsorption/desorption method. Further, the specific surface area is generally from 300 to 900 m$^2$/g, preferably from 400 to 900 m$^2$/g. The pore volume and the specific surface area can be measured by a BET method, by nitrogen gas adsorption/desorption.

Further, the silica gel of the present invention has a mode diameter (Dmax) of less than 20 nm on a pore distribution curve calculated by a BJH method as disclosed in E. P. Barrett, L. G. Joyner, P. H. Haklenda, *J. Amer. Chem. Soc.*, vol. 73, 373 (1951) from an isothermal desorption curve measured by a nitrogen gas adsorption/desorption method, i.e. a figure obtained by plotting a differential nitrogen gas adsorption amount ($\Delta V/\Delta$ (logd): V is the nitrogen gas adsorption volume) relative to the pore diameter d (nm). The lower limit is not particularly limited, but it is preferably at least 2 nm. This means that the mode diameter (Dmax) of the silica gel of the present invention is smaller than that of a conventional silica gel.

The silica gel of the present invention is characterized by that the volume of pores having diameters within ±20% of the above mode diameter (Dmax) is at least 50%, more preferably at least 60%, of the total pore volume. Typically the volume of pores having diameters within ±20% of the above mode diameter (Dmax) is at most 90%. This means that the silica gel of the present invention comprises pores having diameters in the vicinity of the mode diameter (Dmax).

Further, the silica gel of the present invention has a differential pore volume $\Delta V/\Delta$ (logd) particularly preferably of from 5.0 to 12.0 ml/g at the mode diameter (Dmax) as calculated by the above BJH method (here, in the above formula, d is the pore diameter (nm) and V is the nitrogen gas adsorption volume). The silica gel of the present invention wherein the differential pore volume $\Delta V/\Delta$ (logd) is within the above range has an extremely sharp peak of the mode diameter (Dmax).

The silica gel of the present invention is characterized, in addition to the above characteristics in the pore structure, by being amorphous in view of its three-dimensional structure, namely, it is characterized in that no crystalline structure can be confirmed therein. This means that substantially no crystalline peak can be confirmed when the silica gel of the present invention is analyzed by X-ray diffraction. Within the context of the present invention a silica gel will not be amorphous if it has an X-ray diffraction pattern with at least one peak indicating crystalline structure at a position greater than 6 Å units d-spacing. The silica gel which is amorphous has an excellent hydrothermal resistance as compared with the silica gel which is crystalline.

Further, with respect to the structure of the silica gel of the present invention, characteristic results can be obtained in analysis by solid state Si-NMR. Namely, in solid state Si-NMR, the value of "Q4/Q3" which indicates the molar ratio of Si having four —OSi bonded thereto to Si having three —OSi bonded thereto of the silica gel of the present invention is usually at least 1.3, preferably at least 1.5. It is considered that heat stability is high when the value of "Q4/Q3" is high in general. Typically the value of "Q4/Q3" will be no greater than 10.

The last characteristic of the silica gel of the present invention is that the total content of metal impurities except for silicon constituting the skeleton of the silica gel is at most 500 ppm, preferably at most 100 ppm, more preferably at most 10 ppm, most preferably at most 1 ppm, and the silica gel has an extremely high purity. Such a small influence of the impurities is one of great factors to show excellent properties such as heat resistance and hydrothermal resistance of the silica gel of the present invention.

A method for producing the silica gel of the present invention having physical properties as explained above is not particularly limited other than by not aging prior to hydrothermal treatment, and the silica gel may be produced by applying a method of subjecting to a hydrothermal treatment, a silica hydrogel obtained by hydrolyzing an alkali silicate or obtained by hydrolyzing a silicon alkoxide, preferably by hydrolyzing a silicon alkoxide.

The silicon alkoxide to be used as a material for the silica gel of the present invention may, for example, be a tri- or tetraalkoxysilane having a $C_{1-4}$ lower alkyl group or its oligomer, such as trimethoxysilane, tetramethoxysilane, triethoxysilane, tetraethoxysilane, tetrapropoxysilane or tetrabutoxysilane, and preferred are tetramethoxysilane, tetraethoxysilane and their oligomers. The above silicon alkoxides may be easily purified by distillation and are suitable as a material for a silica gel having a high purity. The total content of metal impurities in the silicon alkoxides is preferably at most 100 ppm, more preferably at most 10 ppm. The content of metal impurities may be measured by the same method as the one used to determine impurities in the silica gel.

The hydrolysis of the silicon alkoxide may be carried out by using usually from 2 to 10 mol, preferably from 3 to 8 mol of water based on 1 mol of the silicon alkoxide. A hydrogel of silica and an alcohol are formed by the hydrolysis of the silicon alkoxide. This hydrolysis may be carried out usually at a temperature of from room temperature to about 100° C., but may be carried out at a high temperature by maintaining the liquid phase under elevated pressure. The reaction time depends on the reaction solution composition (type of the silicon alkoxide and the molar ratio with water) and the reaction temperature, and is not necessarily defined since the time for gelation can vary. Preferably, the reaction time is at most the time that a breaking stress of a hydrogel becomes at most 6 MPa. Here, an acid, an alkali, a salt or the like may be added to the reaction system as a catalyst to accelerate the hydrolysis. However, use of such an additive may cause aging of the formed hydrogel as described hereinafter, and is thereby unfavorable for production of the silica gel of the present invention.

In the above hydrolysis reaction of the silicon alkoxide, a silicon alkoxide undergoes hydrolysis so that the silicate is produced and subsequently a condensation reaction of the silicate takes place, the viscosity of the reaction solution increases, and the silicate undergoes gelation to form a hydrogel and is solidified finally. To produce the silica gel of the present invention, it is important to immediately carry out a hydrothermal treatment without substantially aging the hydrogel of silica formed by the hydrolysis so that it is not completely solidified. When the silicon alkoxide is hydrolyzed, a weak hydrogel of silica is formed, and by a conventional method of subjecting this hydrogel to aging, drying and a hydrothermal treatment to finally obtain a stably hard silica gel, no silica gel having physical properties within ranges as specified in the present invention can be produced.

To immediately subject the hydrogel of silica formed by the hydrolysis to a hydrothermal treatment substantially without aging as mentioned above, means that the hydrogel of silica is subjected to a subsequent hydrothermal treatment while maintaining a weak state immediately after the hydrogel of silica is formed. It is not preferred to add e.g. an acid, an alkali or a salt to the hydrolysis reaction system of the silicon alkoxide or to raise the temperature of the hydrolysis reaction too strictly, which accelerates aging of the hydrogel. Further, the temperature should not be raised too high or the time should not be taken so long more than necessary when the hydrogel is washed with water, dried or left to stand as an after-treatment after the hydrolysis.

As a means to specifically confirm the aging state of the hydrogel, the hardness of the hydrogel measured by a method as disclosed in Examples described hereinafter may be employed. Namely, a silica gel having physical properties within ranges as specified in the present invention can be obtained by subjecting a hydrogel in a soft state having a breaking stress of usually at most 6 MPa, preferably at most 3 MPa, more preferably at most 2 MPa, to a hydrothermal treatment.

As conditions of the hydrothermal treatment, water may be in either state of liquid or gas, and may be diluted by a solvent or another gas, but water in a liquid state is preferably used. Water in an amount of usually from 0.1 to 10 times, preferably from 0.5 to 5 times, particularly preferably from 1 to 3 times of the weight of the hydrogel of silica is added to obtain a slurry, and the treatment is carried out at a temperature of usually from 40 to 250° C., preferably from 50 to 150° C., for usually from 0.1 to 100 hours, preferably from 1 to 10 hours. In the water to be used for the hydrothermal treatment, e.g. a lower alcohol, methanol, ethanol or propanol may be contained. This hydrothermal treatment method can be applied to a case of a material having silica gel in a form of a membrane or layers formed on a matrix such as particles, a substrate or a tube, with a purpose of making a membrane reactor. Here, it is possible to carry out the hydrothermal treatment by using a reactor for the hydrolysis reaction and subsequently changing the conditions, however, the optimum conditions are usually different between the hydrolysis reaction and the subsequent hydrothermal treatment, and accordingly it is usually difficult to obtain the silica gel of the present invention by such a means.

With respect to the above hydrothermal treatment conditions, when the temperature is raised, the pore diameter and the pore volume of the obtained silica gel tend to be large. Further, the specific surface area of the silica gel tends reach to the maximum once and then gradually decrease along with the treatment time. Accordingly, it is necessary to select proper conditions depending upon the desired physical properties taking the above tendencies into consideration. However, the physical properties of the silica gel are likely to change in the hydrothermal treatment, and accordingly it is preferred to carry out the hydrothermal treatment at a temperature higher than the above hydrolysis reaction condition in general.

It tends to be difficult to obtain the silica gel of the present invention if the temperature and the time for the hydrothermal treatment are beyond the above ranges. For example, if the temperature of the hydrothermal treatment is too high, the pore diameter and the pore volume of the silica gel tend to be too large, and the pore distribution tends to be broad. On the contrary, if the temperature of the hydrothermal treatments is too low, the formed silica gel tends to have a low degree of crosslinking and tends to be poor in heat stability, and no peak may appear in the pore distribution, or the above Q4/Q3 value tends to be extremely small in the solid state Si-NMR.

Here, when the hydrothermal treatment is carried out in ammonia water, the same effects can be obtained at a temperature lower than that in a case of carrying out the treatment in pure water. Further, when the hydrothermal treatment is carried out in ammonia water, the silica gel to be obtained finally tends to be hydrophobic in general as compared with a case of the treatment in pure water, and the hydrophobicity becomes particularly high when the hydrothermal treatment is carried out at a relatively high temperature of from 100 to 150° C. Here, the ammonia concentration of the ammonia water is preferably from 0.001 to 10%, particularly preferably from 0.005 to 5%.

The silica hydrogel subjected to the hydrothermal treatment is dried usually at from 40 to 200° C., preferably from 60 to 120° C. The drying method is not particularly limited, and it may be a batch or continuous system, and may be carried out under normal or reduced pressure. In a case where a carbon content derived from the silicon alkoxide as the material is contained, it may be removed by sintering at a temperature of usually from 400 to 600° C., as the case requires. The silica hydrogel may be heated to remove the carbon content derived from the silicon alkoxide as the material. Further, pulverization and classification may be carried out as the case requires to obtain the final desired silica gel of the present invention.

The silica gel which has a crystalline structure tends to be poor in hydrothermal resistance and the gel easily includes crystalline structure when hydrolysis of silicon alkoxide proceeds in the presence of a template such as a surfactant, used for the formation of pores in the gel. Accordingly, in a preferred embodiment of the present invention, hydrolysis is conducted in the absence of a template, such as a surfactant in an amount sufficient to function as a template.

Now, the present invention will be described in further detail with reference to Examples. However, it should be understood that the present invention is by no means restricted to such specific Examples.

(1) Measurement of Hardness of Hydrogel of Silica

A silicon alkoxide and water in an amount of 6 molar times the silicon alkoxide were reacted in a 5 liter separable flask, and after the temperature of the reaction solution reached the boiling point of the alcohol to be formed by the reaction, the reaction solution was drawn from the flask, and the drawn reaction solution was put in a 50 cc glass screw tube in a certain amount (at a level of 20 mm as the liquid depth) and sealed, and the tube was held in a water bath having its temperature controlled to be substantially constant, and the disruptive strength was measured by means of a digital force gage (manufactured by A & D, model: AD-4935) with the passage of aging time. A probe (stainless round bar having a diameter of 5 mm) was attached to the measuring apparatus, and when it was slowly pushed into the hydrogel, it broke the hydrogel held in the container by compression. The maximum stress applied until the hydrogel was broken by compression was taken as the breaking stress.

The measurement results are shown in FIG. 1. FIG. 1 was obtained by plotting the common logarithm of the aging time of the hydrogel of silica on the horizontal axis and the breaking stress on the vertical axis. It is found from FIG. 1 that the breaking stress becomes high along with the passage of aging time and that the aging rate depends on the temperature.

(2) Analysis Method of Silica Gel

1) Pore Volume and Specific Surface Area

The pore volume and the specific surface area were obtained by measuring a BET nitrogen adsorption isotherm by AS-1 manufactured by Quantachrome. Specifically, as the pore volume, the value under a relative pressure of P/P0=0.98 was employed, and the specific surface area was calculated from the nitrogen adsorption amounts at three points under P/P0=0.1, 0.2 and 0.3 by a BET multiple method. Further, a pore distribution curve and a differential pore volume at the mode diameter (Dmax) were obtained by BJH method.

2) Powder X-ray Diffraction

Measurement was carried out by means of RAD-RB apparatus manufactured by Rigaku Electric Corporation employing CuKα as a source. The divergent slit was ½ deg, the scattering slit was ½ deg, and the acceptance slit was 0.15 mm.

3) Content of Metal Impurities

Hydrofluoric acid was added to 2.5 g of a sample, followed by heating and evaporation to dryness, and water was added thereto to obtain 50 ml of an aqueous solution. Using this aqueous solution, ICP emission spectral analysis was carried out. Here, sodium and potassium were analyzed by flame analysis.

4) Solid State Si-NMR (Q4/Q3 Value)

Measurement was carried out by means of MSL300 solid state NMR apparatus manufactured by Bruker at a resonance frequency of 59.2 MHz (7.05 T) using a 7 mm CP/MAS (Cross Polarization/Magic Angle Spinning) probe.

(2) Production and Evaluation of Silica Gel

EXAMPLES 1 TO 3

1,000 g of pure water was introduced into a 5 liter separable flask (jacketed) made of glass and equipped with a water-cooled condenser of air open system at the upper part thereof. 1,400 g of tetramethoxysilane was introduced thereto over a period of 3 minutes with stirring at 80 rpm. The molar ratio of water/tetramethoxysilane was about 6. Hot water of 50° C. was passed through the jacket of the separable flask. Stirring was subsequently continued, and the stirring was terminated when the temperature of the content reached the boiling point. The formed sol was gelated while subsequently passing hot water of 50° C. through the jacket for about 0.5 hour. Then, the gel was immediately taken out and pulverized by means of a nylon net having an opening of 600 μm to obtain a wet gel (silica hydrogel) in a powder state. 450 g of this hydrogel and 450 g of pure water were introduced in a 1 liter glass autoclave, and a hydrothermal treatment was carried out under conditions as identified in Table 1. After the hydrothermal treatment for a predetermined time, filtration was carried out by means of a No. 5A filter paper, and the filter cake thus obtained was dried under reduced pressure at 100° C. until a constant weight was reached, without washing the filter cake with water.

Figure 2:
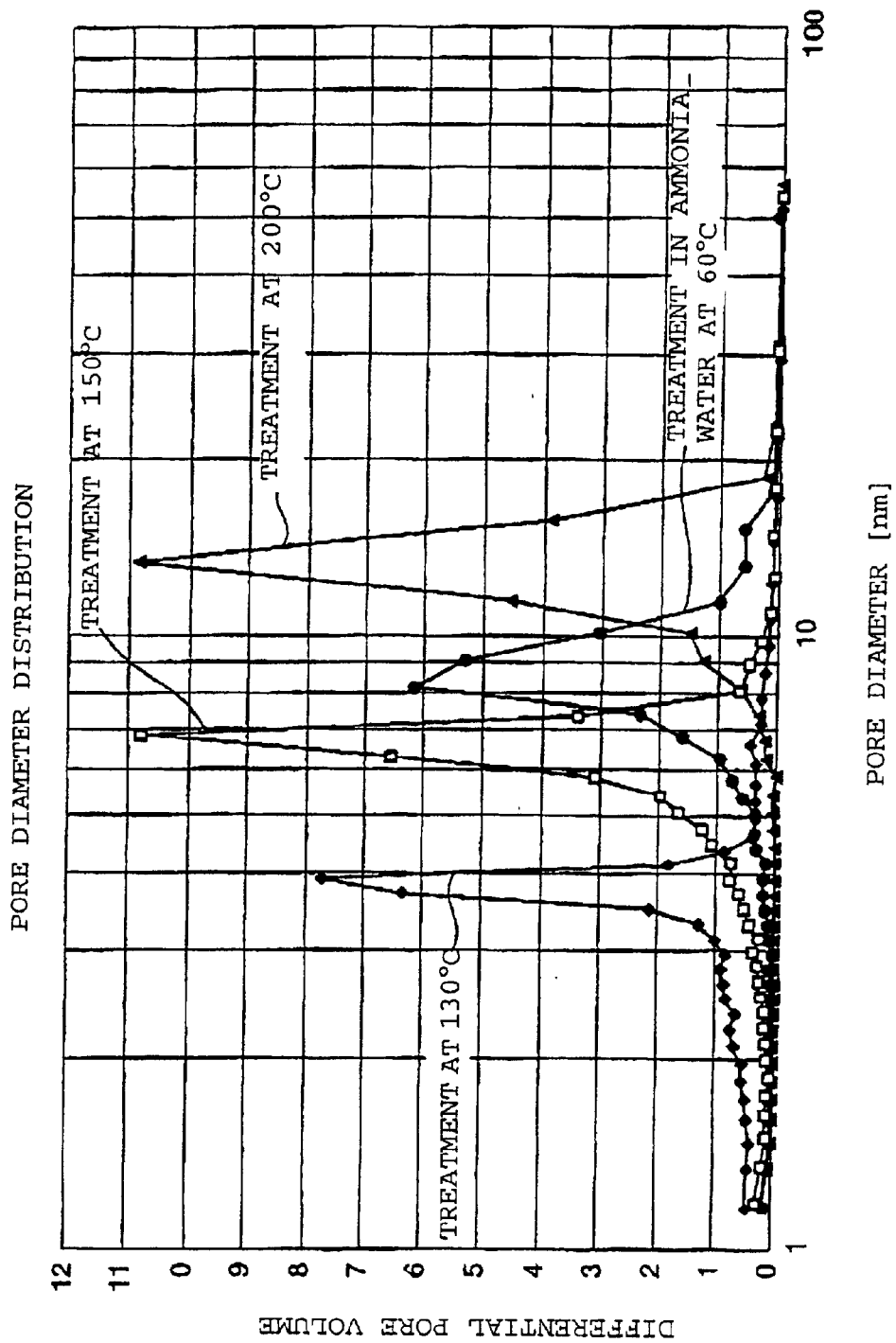
FIG. 2 is a diagram illustrating pore diameter distribution of silica gels of Examples of the present invention.
Figure 3:
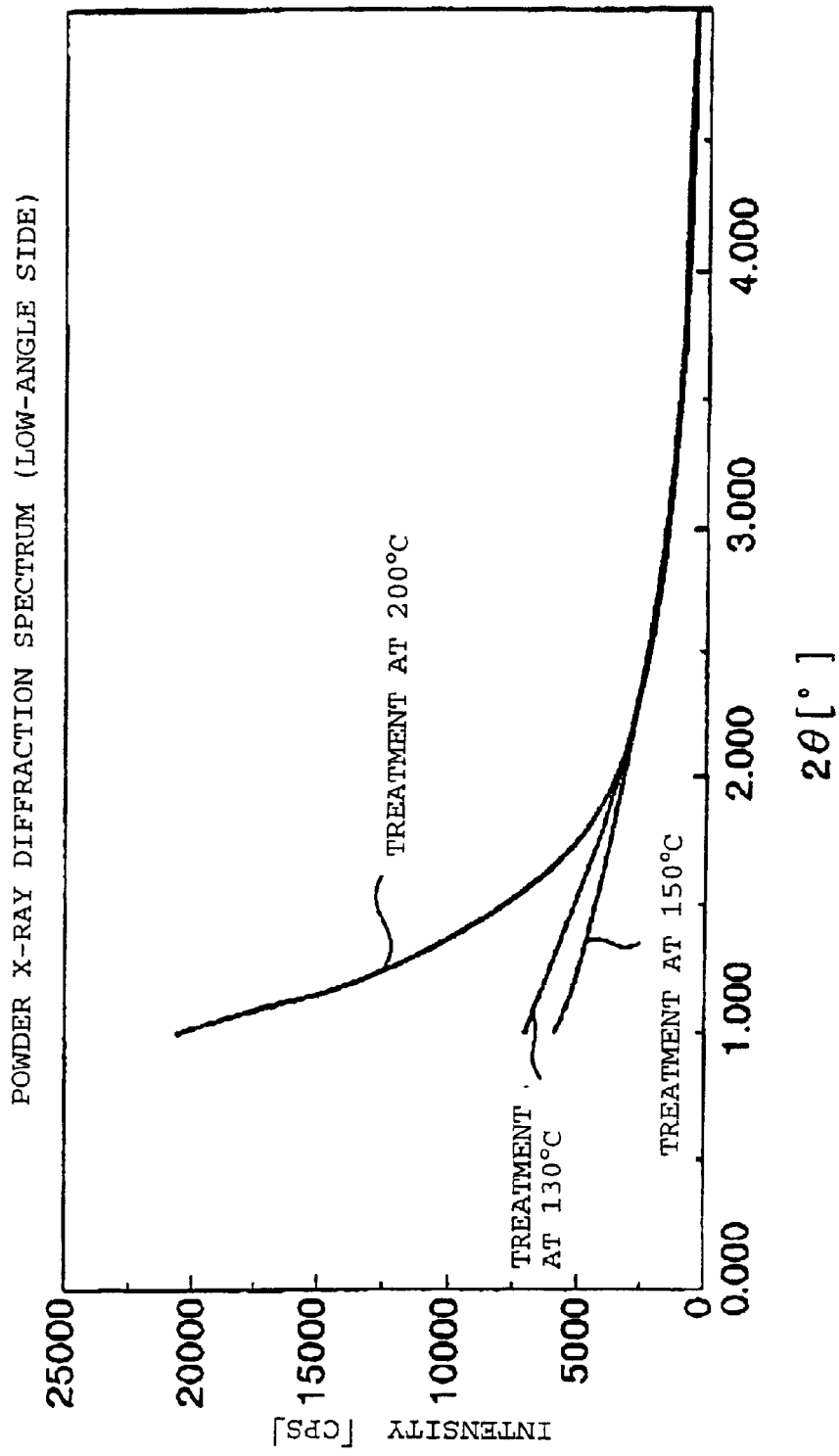
FIG. 3 is a diagram illustrating a powder X-ray diffraction spectrum (at the low-angle side) of the silica gels of Examples of the present invention.
Figure 4:
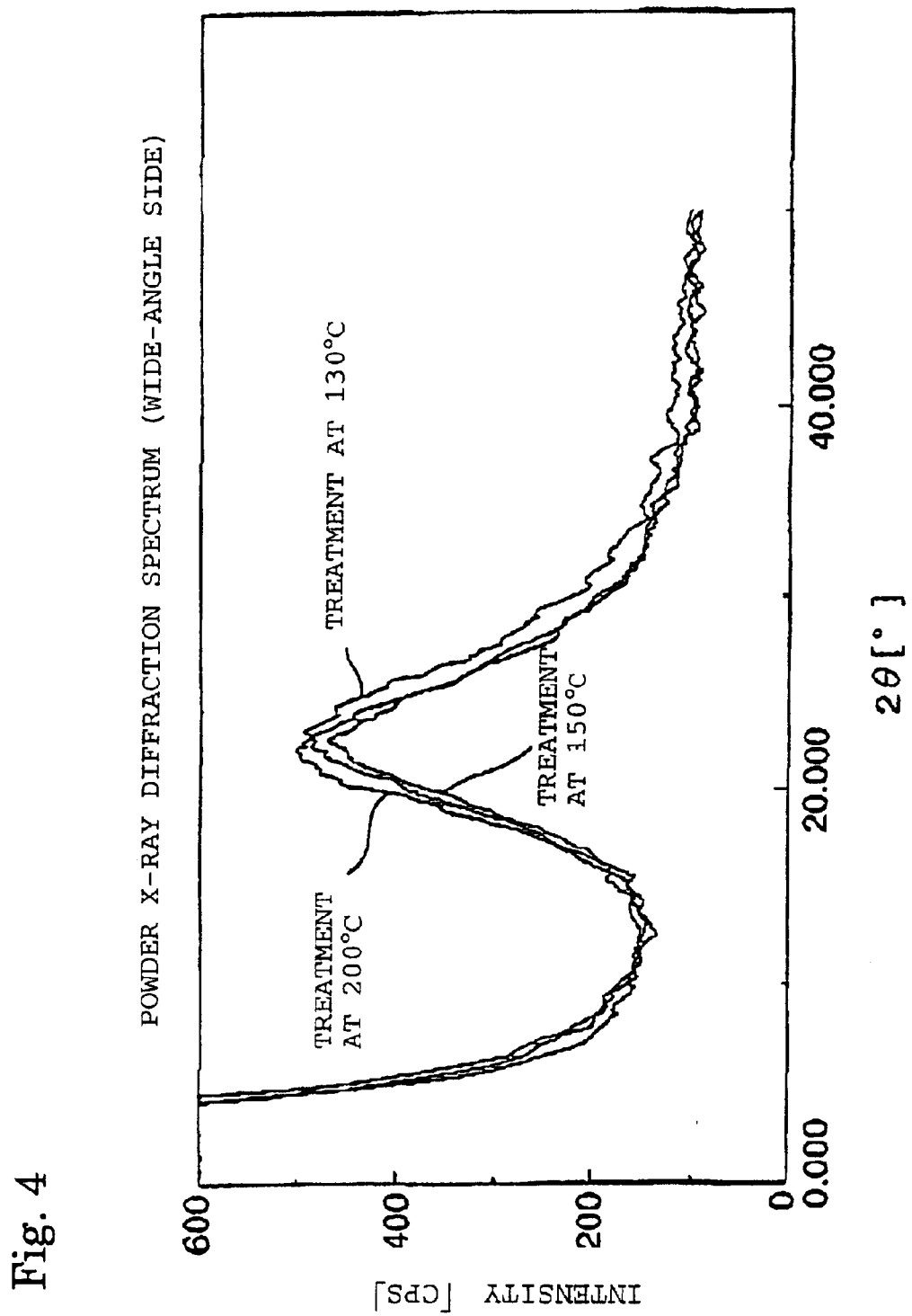
FIG. 4 is a diagram illustrating a powder X-ray diffraction spectrum (at the wide-angle side) of the silica gels of Examples of the present invention.

Physical properties of the obtained silica gel are shown in Table 1. The pore diameter distribution is shown in FIG. 2, the powder X-ray diffraction spectrum at the low-angle side is shown in FIG. 3, and the spectrum at the wide-angle side is shown in FIG. 4. In the powder X-ray diffraction spectra, no crystalline peak appeared, and no peak at the low-angle side due to a periodic structure (2θ≦5 deg) was confirmed.

Here, with respect to the concentrations of impurities in the obtained silica gel, sodium was 0.2 ppm, potassium was 0.1 ppm and calcium was 0.2 ppm, and no magnesium, aluminum, titanium and zirconium were detected, in each of Examples 1 to 3.

EXAMPLE 4

A silica hydrogel was produced in the same manner as in Example 1. 450 g of the silica gel and 450 g of 1 wt % ammonia water were added to a 1 liter autoclave, and a hydrothermal treatment was carried out at 60° C. for 3 hours without stirring. Physical properties of the silica gel after drying are shown in Table 1, and the pore diameter distribution is shown in FIG. 2.

COMPARATIVE EXAMPLE 1

The silica hydrogel produced in Example 1 was put in a sealed container and left to stand at a cold and dark place (from 10 to 15° C.) for 2 weeks for aging, and then a hydrothermal treatment was carried out at 60° C. for 3 hours in the same manner as in Example 1. Physical properties of the silica gel after drying are shown in Table 1.

COMPARATIVE EXAMPLES 2 TO 4

Figure 5:
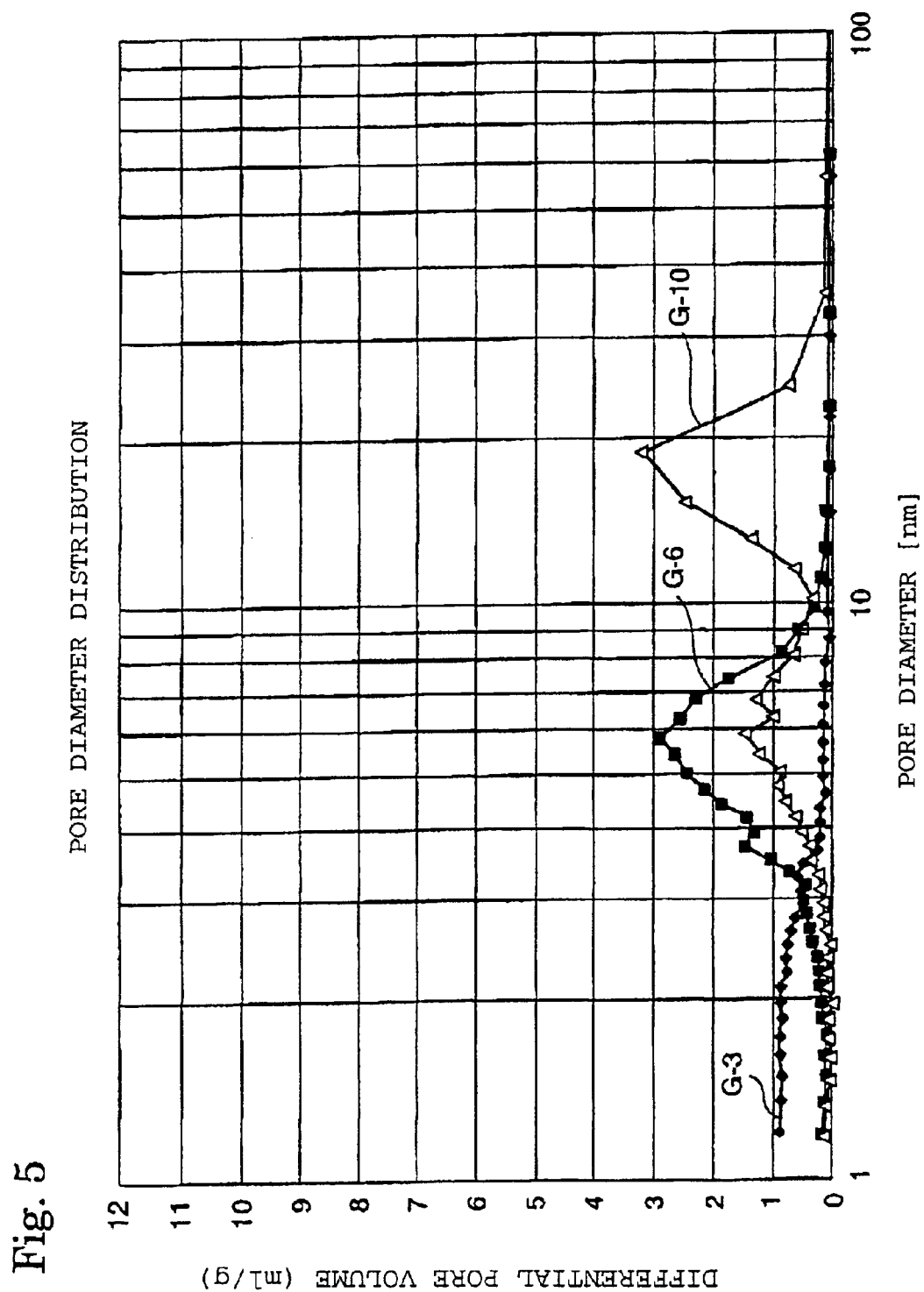
FIG. 5 is a diagram illustrating pore diameter distribution of commercially available silica gels in Comparative Examples.

Physical properties of silica gels for catalyst carrier CARIACT G series (in a pulverized state) manufactured by Fuji Silysia Chemical Ltd. are shown in Table 1, and their pore size distribution are shown in FIG. 5.

Further, the concentrations of metal impurities in G-6 were measured, whereupon sodium was 170 ppm, magnesium was 31 ppm, aluminum was 15 ppm, potassium was 23 ppm, calcium was 160 ppm, titanium was 260 ppm, and zirconium was 44 ppm.

COMPARATIVE EXAMPLE 5

Part of the silica hydrogel used in Example 1 was dried under vacuum at 60° C. for 48 hours and then put in a sealed container, and subjected to a hydrothermal treatment at 150° C. for 3 hours. Physical properties of the silica gel after drying are shown in Table 1.

TABLE 1

|  | Treatment temp. (° C.) | Treatment time (hr) | Pore volume (ml/g) | Specific surface area (m²/g) | Dmax (nm) | Volume of pores having diameters Dmax ± 20% | Differential pore volume at Dmax (ml/g) | Q4/Q3 |
|---|---|---|---|---|---|---|---|---|
| Ex. 1 | 130 | 3 | 0.85 | 859 | 3.9 | 61 | 7.7 | 1.7 |
| Ex. 2 | 150 | 3 | 1.19 | 706 | 6.9 | 69 | 10.8 | 2.3 |
| Ex. 3 | 200 | 3 | 1.52 | 409 | 13.3 | 77 | 10.8 | 3.6 |
| Ex. 4 | 60 | 3 | 1.05 | 437 | 8.2 | 67 | 6.1 | 3.2 |

TABLE 1-continued

|  | Treatment temp. (° C.) | Treatment time (hr) | Pore volume (ml/g) | Specific surface area (m²/g) | Dmax (nm) | Volume of pores having diameters Dmax ± 20% | Differential pore volume at Dmax (ml/g) | Q4/Q3 |
|---|---|---|---|---|---|---|---|---|
| Comp. Ex. 1 | 60 | 3 | 0.37 | 662 | * | * | * | — |
| Comp. Ex. 2 | Name of product: G-3 | | 0.53 | 885 | * | * | * | 1.4 |
| Comp. Ex. 3 | Name of product: G-6 | | 0.91 | 599 | 5.8 | 48 | 2.9 | 2.6 |
| Comp. Ex. 4 | Name of product: G-10 | | 1.20 | 413 | 18.9 | 33 | 3.2 | 3.8 |
| Comp. Ex. 5 | 150 | 3 | 0.40 | 562 | 3.2 | 35 | 3.2 | — |

*: Measurement infeasible since no peak appeared

Figure 6:
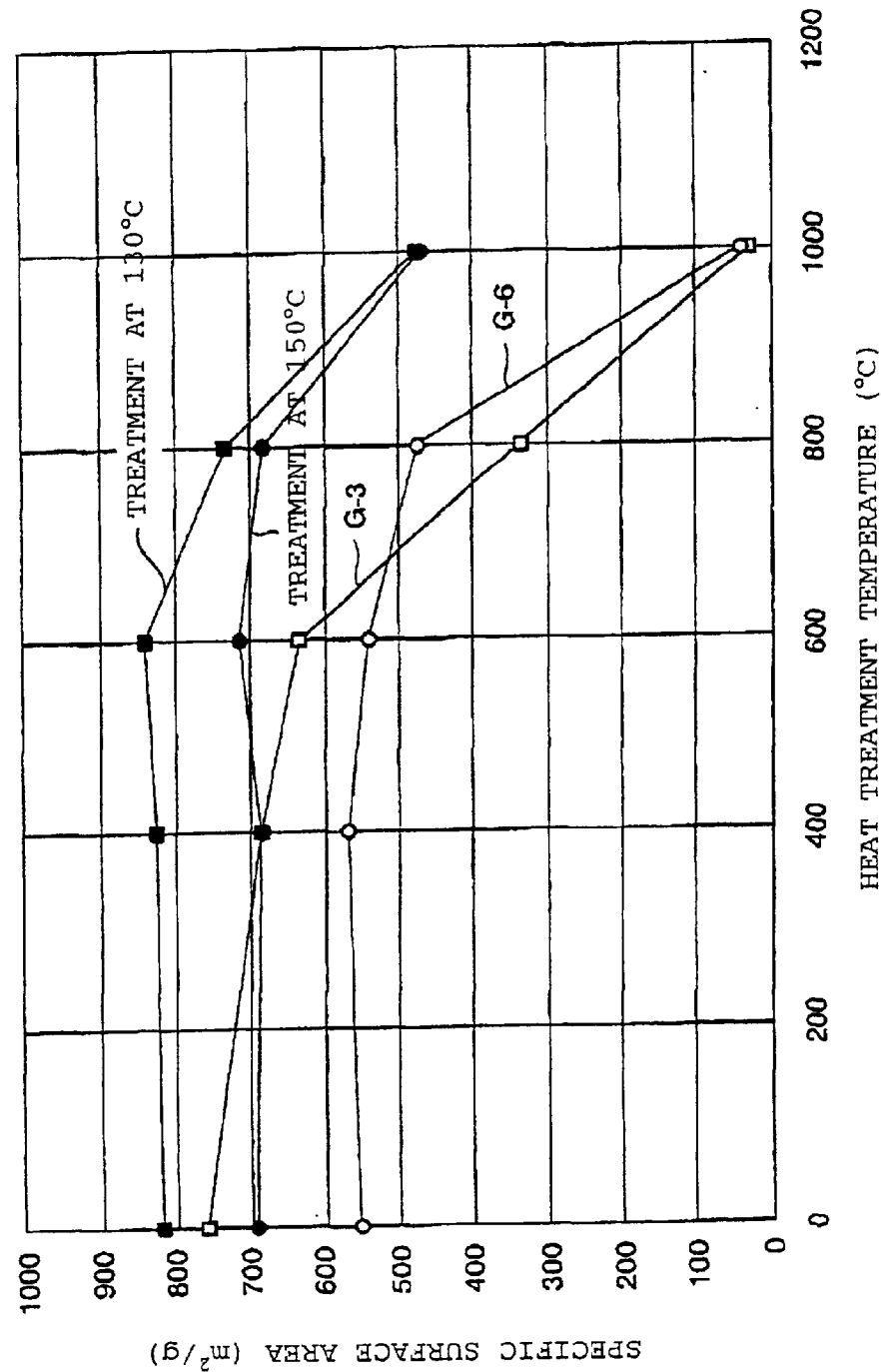
FIG. 6 is a diagram illustrating changes in the specific surface areas by heat treatment of silica gels of Examples of the present invention and silica gels of Comparative Examples.

Test on Heat Resistance of Silica Gel 5 g of silica gel samples of Examples 1 and 2 and Comparative Examples 2 and 3 were put in quartz beakers respectively, and the temperature was raised to a predetermined heat treatment temperature at a rate of 200° C./min in the air atmosphere in an electric furnace. The beakers were held in the predetermined heat treatment temperature for 1 hour and then immediately taken out to room temperature and cooled gradually. With respect to the samples thus obtained, the specific surface areas were measured by BET method by nitrogen gas adsorption/desorption, and the results are shown in FIG. 6. It is found from FIG. 6 that the silica gels of Examples had a smaller change in the specific surface area by the heat treatment as compared with the silica gels of Comparative Examples.

Test on Heat Stability in Water of Silica Gel

Pure water was added to silica gels of Examples 1 to 3 and Comparative Examples 2 to 4 to prepare slurries of 40 wt %. About 40 ml of the slurries thus prepared were put and sealed in stainless steel vessels having a volume of 60 ml respectively, and soaked in an oil bath at 280±1° C. for 3 days. Part of each slurry was taken out from each vessel and subjected to filtration by a 5A filter paper. The obtained filter cakes were dried under vacuum at 100° C. for 5 hours. With respect to these samples thus obtained, the specific surface area was measured and the results are shown in Table 2.

Further, with respect to the above samples, a powder X-ray diffraction pattern was measured in the same manner as mentioned above except that the divergent slit: 1 deg and scattering slit: 1 deg. With respect to the silica gels of Examples 1 to 3 and Comparative Example 2, no peak appeared and the pattern remained to be an amorphous patter. On the other hand, with respect to the silica gels of Comparative Examples 3 and 4, distinct peaks appeared at 2θ±20.9° and 26.6° in the amorphous pattern. These peaks corresponded to peaks of α-quartz, and accordingly it is considered that part of silica gels of Comparative Examples 3 and 4 were crystallized. It is considered that these silica gels underwent crystallization under hydrothermal conditions of high temperature and high pressure and the specific surface area significantly decreased, because these silica gels contain e.g. alkali metals at a high concentration and are likely to undergo change in the structure or particle shape.

Test on Crushing Strength of Silica Gel 1.4±0.2 g of each of the silica gels of Examples 1 and Comparative Example 2 was packed in a tablet machine for IR (tablet diameter 20 mm), and a pressure of 4.0 ton/cm² was applied thereto at room temperature for 3 minutes. Each powder was taken out from the tablet machine, and the specific surface area and the pore volume were measured by a nitrogen adsorption and desorption method, and the results are shown in Table 3.

TABLE 2

|  | Before test on heat stability in water (m²/g) | After test on heat stability in water (m²/g) |
|---|---|---|
| Example 1 | 859 | 57 |
| Example 2 | 706 | 46 |
| Example 3 | 409 | 56 |
| Comparative Example 2 | 855 | 28 |
| Comparative Example 3 | 599 | 4 |
| Comparative Example 4 | 413 | 3 |

TABLE 3

|  | Specific surface area before and after test on crushing (m²/g) | | Pore volume before and after test on crushing (cm³/g) | |
|---|---|---|---|---|
|  | Before test | After test | Before test | After test |
| Example 1 | 819 | 791 | 0.74 | 0.62 |
| Comparative Example 2 | 762 | 572 | 0.53 | 0.32 |

A high mechanical strength is required for a silica gel obtained industrially. In a case where it is used as it is, particles may break due to contact among particles or with an apparatus to form fine powder, thus causing a problem in operation of equipment in which the silica gel is involved. Further, in a case where it is used as a molded product, it is important that it is resistant to the pressure applied during molding, and one having no adequate strength will be formed into a molded product wherein the pore characteristics of the original silica gel can not be put to a good use. A conventional silica gel has no adequate strength. As evident from Table 3, the silica gel of the present invention has an adequate crushing strength.

The novel silica gel of the present invention is excellent in heat resistance and hydrothermal resistance, is highly stable and has a high purity as compared with a conventional silica gel. Further, a silica gel having desired physical properties can be produced by a relatively simple method using a silicon alkoxide as a material.

The silica gel of the present invention can be used for conventional applications of silica gel, and particularly when it is used as e.g. a catalyst carrier or a membrane reactor, deterioration in performance tends to be small, and it can be used more stably for a long period of time.

Obviously, numerous modifications and variations of the present invention are possible in light of the above teachings. It is therefore to be understood that within the scope of the appended claims, the invention may be practiced otherwise than as specifically described herein.

This application is based on Japanese patent applications JP 2000-197558 and JP 2001-066167 filed in the Japanese Patent Office on Jun. 30, 2000 and Mar. 9, 2001 the entire contents of each are hereby incorporated by reference.

What is claimed is:

1. A method of producing a silica gel, which comprises:
   hydrolyzing a silicon alkoxide, thereby forming a hydrogel; and
   subjecting the hydrogel to a hydrothermal treatment substantially without aging the hydrogel, thereby producing said silica gel having the following characteristics:
   (a) a pore volume ranging from 0 6 to 1.6 ml/g,
   (b) a specific surface area ranging from 300 to 900 m$^2$/g,
   (c) a mode diameter (Dmax) of pores of less than 20 nm,
   (d) a volume of pores having diameters within ±20% of Dmax of at least 50% of the total pore volume;
   (e) it is amorphous, and
   (f) the content of metal impurities is at most 500 ppm.

2. The method for producing a silica gel according to claim 1, wherein a hydrogel having a breaking stress of at most 6 MPa is subjected to the hydrothermal treatment.

3. The method for producing a silica gel according to claim 1, wherein the hydrothermal treatment is carried out at a temperature ranging from 50 to 150° C. for from 1 to 10 hours.

4. The method for producing a silica gel according to claim 1, wherein an ammonia water is used for the hydrothermal treatment is conducted in ammonia water.

5. The method for producing a silica gel according to claim 1, wherein hydrolysis of said silicon alkoxide is conducted in the absence of a template.

6. A silica gel, produced by a process comprising:
   hydrolyzing a silicon alkoxide, thereby forming a hydrogel; and
   subjecting the hydrogel to a hydrothermal treatment substantially without aging the hydrogel, thereby producing said silica gel having the following characteristic:
   (a) a pore volume ranging from 0.6 to 1.6 ml/g,
   (b) a specific surface area ranging from 300 to 900 m$^2$/g,
   (c) a mode diameter (Dmax) of pores of less than 20 nm,
   (d) a volume of pores having diameters within ±20% of Dmax of at least 50% of the total pore volume;
   (e) it is amorphous, and
   (f) the content of metal impurities is at most 500 ppm.

7. The silica gel according to claim 6, wherein a hydrogel having a breaking stress of at most 6 MPa is subjected to the hydrothermal treatment.

8. The silica gel according to claim 6, wherein the hydrothermal treatment is carried out at a temperature ranging from 50 to 150° C. for from 1 to 10 hours.

9. The silica gel according to claim 6, wherein the hydrothermal treatment is conducted in ammonia water.

10. The silica gel according to claim 6, wherein the pore volume ranges from 0.8 to 1.6 ml/g.

11. The silica gel according to claim 6, wherein the specific surface area ranges from 400 to 900 m$^2$/g.

12. The silica gel according to claim 6, wherein the mode diameter (Dmax) is at least 2 nm.

13. The silica gel according to claim 6, wherein the volume of pores having diameters within ±20% of Dmax is at least 60% of the total pore volume.

14. The silica gel according to claim 6, wherein the content of metal impurities is at most 10 ppm.

15. The silica gel according to claim 14, wherein the content of metal impurities is at most 1 ppm.

16. The silica gel according to claim 6, wherein the differential pore volume at the mode diameter (Dmax) ranges from 5.0 to 12.0 ml/g.

17. The silica gel according to claim 6, wherein the value of Q4/Q3 in solid state Si-NMR is at least 1.3.

18. The silica gel according to claim 6, wherein hydrolysis of said silicon alkoxide is conducted in the absence of a template.

19. The silica gel according to claim 6, wherein hydrolysis of said silicon alkoxide is conducted in the absence of a template.

20. A silica gel which has the following characteristics:
   (a) a pore volume ranging from 0.6 to 1.6 ml/g,
   (b) a specific surface area ranging from 300 to 900 m$^2$/g,
   (c) a mode diameter (Dmax) of pores of less than 20 nm,
   (d) a volume of pores having diameters within ±20% of Dmax of at least 50% of the total pore volume;
   (e) it is amorphous, and
   (f) the content of metal impurities is at most 500 ppm.

21. The silica gel according to claim 20, wherein the pore volume ranges from 0.8 to 1.6 ml/g.

22. The silica gel according to claim 20, wherein the specific surface area ranges from 400 to 900 m$^2$/g.

23. The silica gel according to claim 20, wherein the mode diameter (Dmax) is at least 2 nm.

24. The silica gel according to claim 20, wherein the volume of pores having diameters within ±20% of Dmax is at least 60% of the total pore volume.

25. The silica gel according to claim 20, wherein the content of metal impurities is at most 10 ppm.

26. The silica gel according to claim 25, wherein the content of metal impurities is at most 1 ppm.

27. The silica gel according to claim 20, wherein the differential pore volume at the mode diameter (Dmax) ranges from 5.0 to 12.0 ml/g.

28. The silica gel according to claim 20, wherein th value of Q4/Q3 in solid state Si-NMR is at least 1.3.

29. The silica gel according to claim 20, which is produced by means of a step of hydrolyzing a silicon alkoxide.

30. A method of producing a silica gel, which comprises:
   hydrolyzing a silicon alkoxide, thereby forming a hydrogel which has breaking stress of at most 6 MPa; and
   subjecting the hydrogel to a hydrothermal treatment substantially without aging the hydrogel, thereby producing said silica gel having the following characteristics:
   (a) a pore volume ranging from 0.6 to 1.6 ml/g,
   (b) a specific surface area ranging from 300 to 900 m$^2$/g,
   (c) a mode diameter (Dmax) of pores of less than 20 nm,
   (d) a volume of pores having diameters within ±20% of Dmax of at least 50% of the total pore volume;
   (e) it is amorphous, and
   (f) the content of metal impurities is at most 500 ppm.

* * * * *